US012585755B1

(12) United States Patent
Myman

(10) Patent No.: US 12,585,755 B1
(45) Date of Patent: Mar. 24, 2026

(54) TIME BOUND EVENT CREATION AND MANAGEMENT BASED ON USER SPECIFIC MEDIA PERMISSIONS

(71) Applicant: Myseum, Inc, New Brunswick, NJ (US)

(72) Inventor: Darin Myman, West Palm Beach, FL (US)

(73) Assignee: Myseum, Inc., New Brunswick, NJ (US)

( * ) Notice: Subject to any disclaimer, the term of this patent is extended or adjusted under 35 U.S.C. 154(b) by 0 days.

(21) Appl. No.: 19/340,298

(22) Filed: Sep. 25, 2025

(51) Int. Cl.
G06F 21/45 (2013.01)

(52) U.S. Cl.
CPC .................................... G06F 21/45 (2013.01)

(58) Field of Classification Search
CPC ....................................................... G06F 21/45
See application file for complete search history.

(56) References Cited

U.S. PATENT DOCUMENTS

2015/0036004 A1* 2/2015 Harwell ................ G06F 3/0481
715/753
2017/0025152 A1* 1/2017 Jaime ................... H04N 21/854

OTHER PUBLICATIONS https://catchmemo.com/, retrieved from the Internet on Jun. 6, 2025, copyright 2025 CatchMemo, 129 pages.
https://eventshare.io, retrieved from the Internet on Jun. 6, 2025, copyright 2025 EventShare, 125 pages.
https://guestcam.co/, retrieved from the Internet on Jun. 6, 2025, copyright 2024 GuestCam, 282 pages.
https://www.happyfeed.com/, retrieved from the Internet on Jun. 6, 2025, copyright 2025 HappyFeed Inc., 443 pages.

* cited by examiner

*Primary Examiner* — Huan V Doan
(74) *Attorney, Agent, or Firm* — Sheppard Mullin Richter & Hampton LLP

(57) ABSTRACT

A computer-implemented method is disclosed for creating and managing time-bound events with event-specific media permissions. The method provides a secure content application interface for users to define event parameters, including duration and media control settings. Upon event creation, the system generates an event record with identifiers, timing, participants, and permission rules. Media contributions are either uploaded from device galleries or captured directly and are controlled according to defined permissions such as restrictions on downloading, saving, deletion, and time-based access.

20 Claims, 7 Drawing Sheets

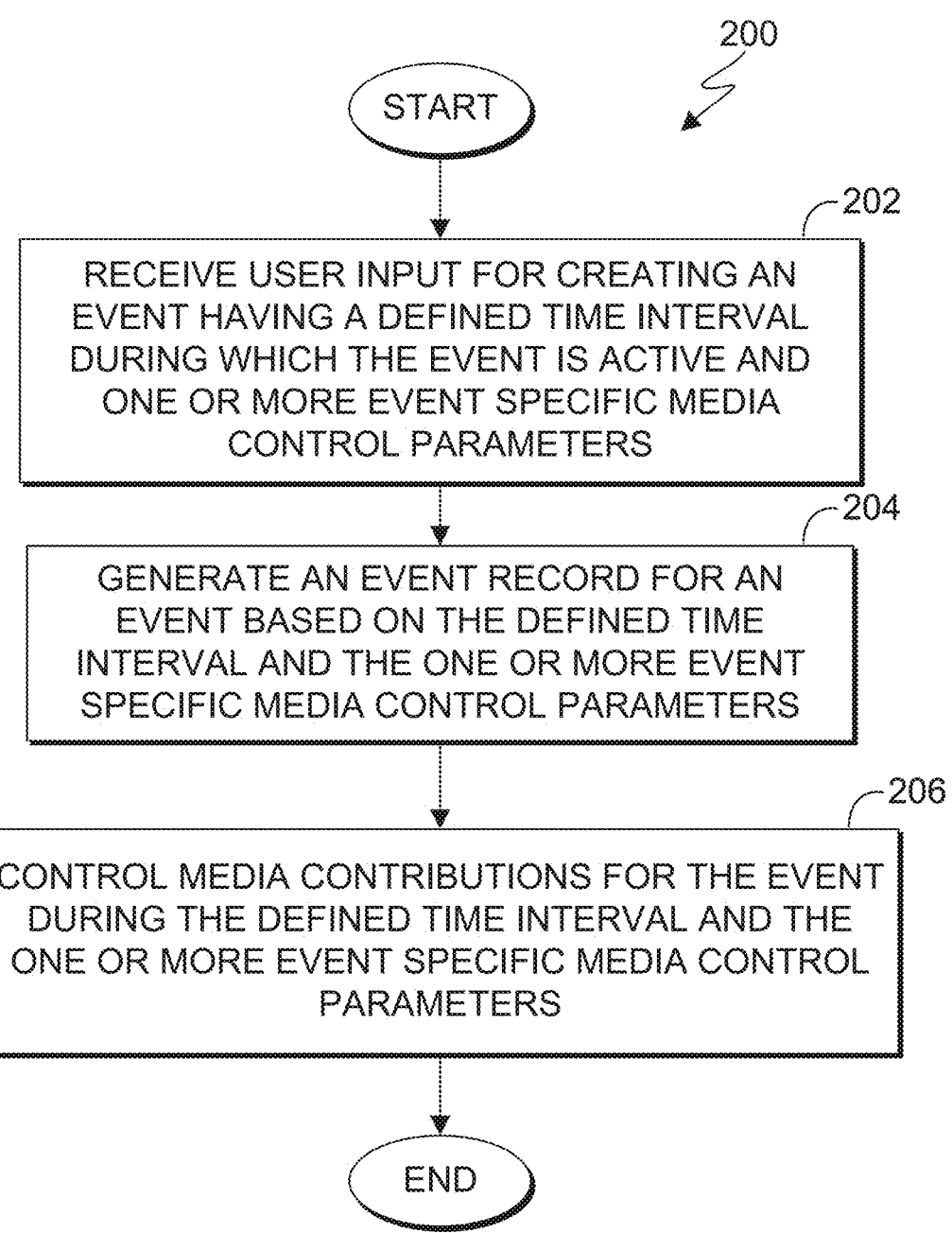

200

START

RECEIVE USER INPUT FOR CREATING AN
EVENT HAVING A DEFINED TIME INTERVAL
DURING WHICH THE EVENT IS ACTIVE AND
ONE OR MORE EVENT SPECIFIC MEDIA
CONTROL PARAMETERS

202

GENERATE AN EVENT RECORD FOR AN
EVENT BASED ON THE DEFINED TIME
INTERVAL AND THE ONE OR MORE EVENT
SPECIFIC MEDIA CONTROL PARAMETERS

204

CONTROL MEDIA CONTRIBUTIONS FOR THE EVENT
DURING THE DEFINED TIME INTERVAL AND THE
ONE OR MORE EVENT SPECIFIC MEDIA CONTROL
PARAMETERS

206

END

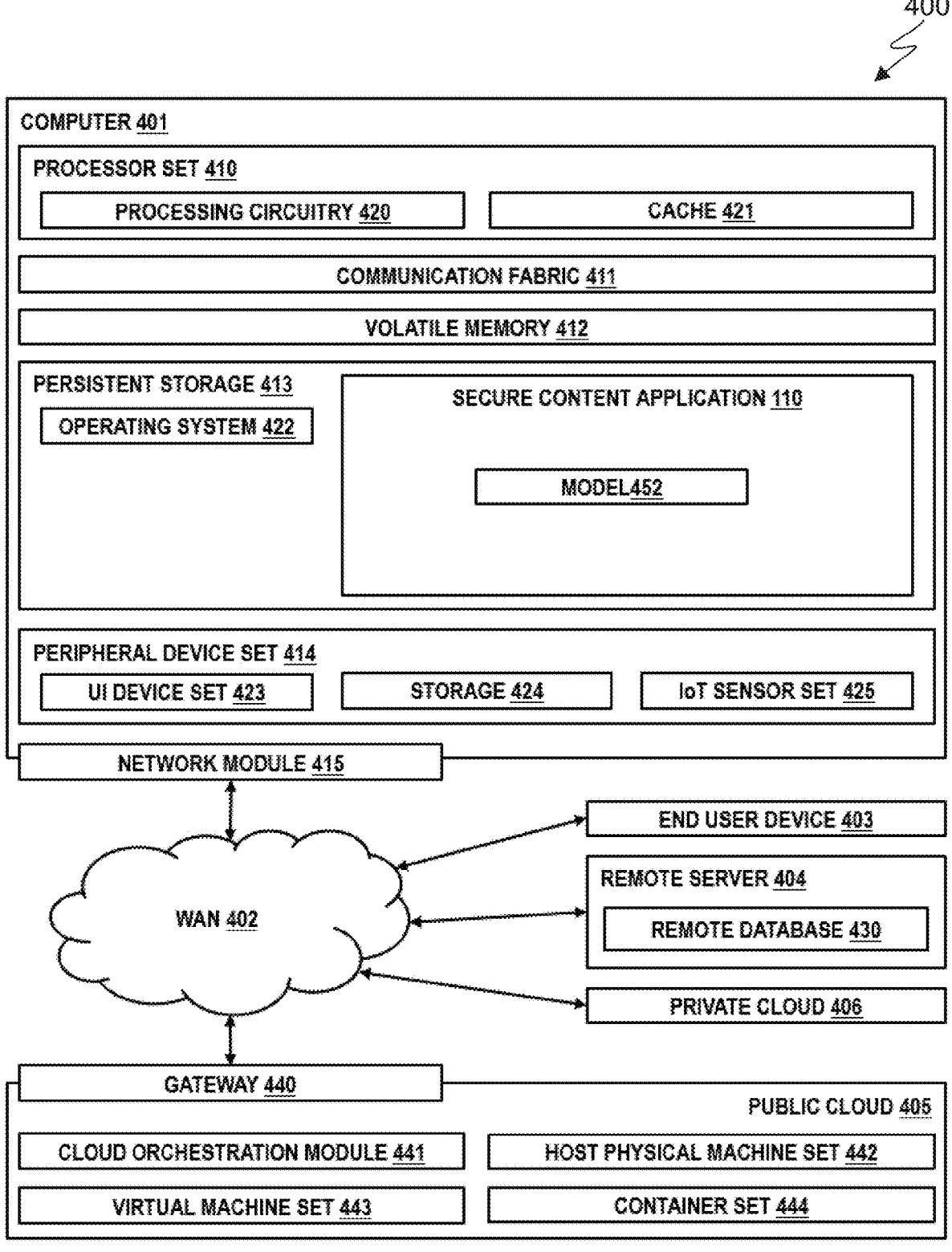

COMPUTER 401

PROCESSOR SET 410

PROCESSING CIRCUITRY 420        CACHE 421

COMMUNICATION FABRIC 411

VOLATILE MEMORY 412

PERSISTENT STORAGE 413

OPERATING SYSTEM 422

SECURE CONTENT APPLICATION 110

MODEL452

PERIPHERAL DEVICE SET 414

UI DEVICE SET 423        STORAGE 424        IoT SENSOR SET 425

NETWORK MODULE 415

WAN 402

END USER DEVICE 403

REMOTE SERVER 404

REMOTE DATABASE 430

PRIVATE CLOUD 406

GATEWAY 440

PUBLIC CLOUD 405

CLOUD ORCHESTRATION MODULE 441        HOST PHYSICAL MACHINE SET 442

VIRTUAL MACHINE SET 443        CONTAINER SET 444

TIME BOUND EVENT CREATION AND MANAGEMENT BASED ON USER SPECIFIC MEDIA PERMISSIONS

TECHNICAL FIELD

The invention relates to systems and methods for managing event-based media sharing. More particularly, aspects of the disclosed systems and methods may create time bound events with event specific media permissions for media handling and dynamic event prioritization.

BACKGROUND

Event-based media sharing platforms may generally allow users to create shared spaces or galleries to aggregate media contributed by participants. These platforms typically facilitate some combination of group photo or video sharing, event-specific landing pages or galleries, and invite mechanisms such as QR codes or shareable links. Administrative functionality may include limited access controls, dashboard features, and, in some cases, basic guest management.

Existing systems may provide only rudimentary controls over who can upload, download, or delete shared media, lacking event-specific granularity or support for dynamic constraints based on time or user identity. The inability to define and enforce custom permission sets for media management at the event level can lead to security and data integrity concerns. Further, few existing systems support automated upload workflows that ensure immediate contextual relevance, such as allowing media captured during a live event window to be directly and securely routed to the corresponding group gallery without intermediary steps.

While tools may use QR codes or invitation links to facilitate entry into event spaces, these mechanisms often lack depth in the areas of access control, authentication, and robust app-to-event association. Users may be required to register, download an app, or otherwise input personal data, but lack event-specific access codes that enforce strict association between a user's identity and their permitted event activities. Consequently, unauthorized access or improper event association may occur.

Another technical limitation arises in the area of dynamic display and event prioritization. Most platforms present galleries or feeds in static, chronological order or according to generic rules, without evaluating real-time participant activity or user relevance for presentation. The lack of intelligent prioritization mechanisms means users may need to manually search, scroll, or filter to locate the most relevant event during busy periods or when associated with multiple concurrent events.

Furthermore, existing systems lack mechanisms for distinguishing between original and non-original content, fail to effectively synchronize event duration with permitted media activities, and do not provide comprehensive technical integration of permission enforcement tied to user roles and event parameters. These technical deficiencies highlight the limitations of current event-based media sharing platforms and underscore the need for improvements that provide event-specific media permissions for media handling and dynamic event prioritization.

BRIEF SUMMARY OF THE DISCLOSURE

Aspects of the disclosed systems and methods enable users to create time bound events with event specific media permissions for media handling and dynamic event prioritization. More specifically, the systems and methods may allow users to create and configure events by specifying parameters such as duration, access controls, and event specific media permissions and control real-time media contributions by enabling uploads from a device's camera roll or direct capture from the device's camera, while enforcing event-specific media permissions such as upload, download, viewing, and deletion rights.

For example, the system may provide a secure content application, which provides a protected environment for users to create, share, and manage event-based media. Processors may execute software modules such as an event management module to create and configure group events and store associated data such as duration, permissions, and participant lists, a secure access module for generating unique event codes (e.g., QR codes or secure links) and authenticating users, and a media control module for capturing media capture, uploading from camera roll or direct from camera, and enforcing event-specific permissions regarding downloading, deletion, and sharing. Additional modules include participant management, which tracks invited users and their roles, a dynamic prioritization module, which analyzes activity and recency to determine which events are most relevant, and a user interface module for inputting user-defined parameters, capturing or uploading media, displaying notifications, and interacting with event-specific content.

A user may create a new event via the user interface having a defined time interval during which the event is active. In response to receiving user input to create an event, the event management module 112 generates an event record including an event identifier, title, timing attribute, participant list, and media control parameters that define how content associated with the event may be accessed, saved, or deleted.

To provide secure and streamlined access, the secure access module generates an event-specific access code, such as a QR code or digital link, encoding event access information. This access code is associated with designated participants and distributed to them using common messaging or notification channels. When a participant accesses the event-specific code during the active period, the secure access module determines whether the secure content application is present on the participant's device. If not, the participant is directed to a link to download the application. If present, the secure content application is launched to automatically display the media and interface associated with the specific event.

Within the application, the user interface module displays a list of active events associated with the user through selectable tabs or other display portions. When a user selects an active event and creates media content within the application—either by capturing a photo or recording a video—the media control module, in coordination with the user interface module, automatically uploads the content to the selected event, obviating the need to first save to the device's camera roll during the event's active interval. Similarly, when a participant creates media content during the event's live period, the media control module ensures the immediate upload of created media to the selected event, so that all contributions are timely and contextually relevant.

In response to submitted media content, the media control module evaluates whether the media satisfies the defined media control parameters prior to publishing the received media. These parameters, specified by a user and stored by the event management module as part of the event record, may include conditions such as whether downloading by other participants is permitted, whether content may be saved to user galleries, and what deletion or modification restrictions apply, including time or content-based rules. The media control module determines compliance, and uploads the content for access by all event participants. If the media control module determines that uploaded media is not original content generated by the submitting participant, the module may delete such content to ensure authenticity and compliance with the defined media control parameters.

To facilitate an intuitive and responsive user experience, the dynamic prioritization module dynamically highlights or prioritizes the display of event media upon a user's launch of the application using an event-specific code, positioning new event activity for an active event above other active or past events. If the participant management module determines that the user is associated with only one active event, the user interface module automatically displays that event. If the participant management module determines the user is associated with multiple active events, the dynamic prioritization module applies prioritization rules, such as displaying the most recently created event or the event with the highest participant activity.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a flowchart depicting an example of operational steps for controlling media contributions for an event during a defined time interval, in accordance with various embodiments of the systems and methods disclosed herein.

FIG. 4 depicts a block diagram illustrating an alternate computing environment, in accordance with various embodiments of the systems and methods disclosed herein.

DETAILED DESCRIPTION

The present disclosure addresses various challenges associated with inflexible media permission controls, inadequate synchronization of event timing with permitted media actions, and limited integration of participant authentication and role-based access. Conventional platforms generally rely on static galleries, basic invite mechanisms, and uniform permissions, which fail to take into account dynamic event-specific constraints, real-time activity tracking, or secure user-event association. As a result, these systems do not adequately address needs for immediate media capture and upload or enforce customized permissions at the media and participant level.

To address these shortcomings, aspects of the disclosed system and methods provide technical solutions that improve the functioning of the computer and integrate such improvements into a practical application. By employing specialized software modules such as an event management module for structured event creation and secure data storage, a secure access module for generating and distributing event-specific codes, a media control module for enforcing granular permissions, and a dynamic prioritization module for real-time event ranking, embodiments of the present invention provide an integrated technical solution that allows users to create and configure events by specifying parameters such as duration, access controls, and event specific media permissions and control real-time media contributions by enabling uploads from a device's camera roll or direct capture from the device's camera, while enforcing event-specific media permissions such as upload, download, viewing, and deletion rights. The architecture enables automated coordination between event parameters, participant identities, and media actions, tightly coupling these in the underlying system data structures and workflows. For example, secure content application 110 not only authenticates users, but also dynamically presents prioritized, contextually relevant event feeds, and seamlessly enforces user-specific media restrictions based on the role and timing, all of which are executed programmatically rather than manual administrative steps.

These features represent a technological advancement rooted in the improvement of computer functionality. The invention does not simply process or display information; it solves particular technological challenges in group event media management by leveraging computer systems to securely associate users and media with dynamically configured events and enforce time-bound, participant-specific permissions in real time. Immediate automated media upload and display, tiered access via application-managed event codes, and compliance verification for media actions deliver a practical application that is integrated into real-world group collaboration scenarios, rather than claiming the abstract idea of grouping photos.

Figure 1:
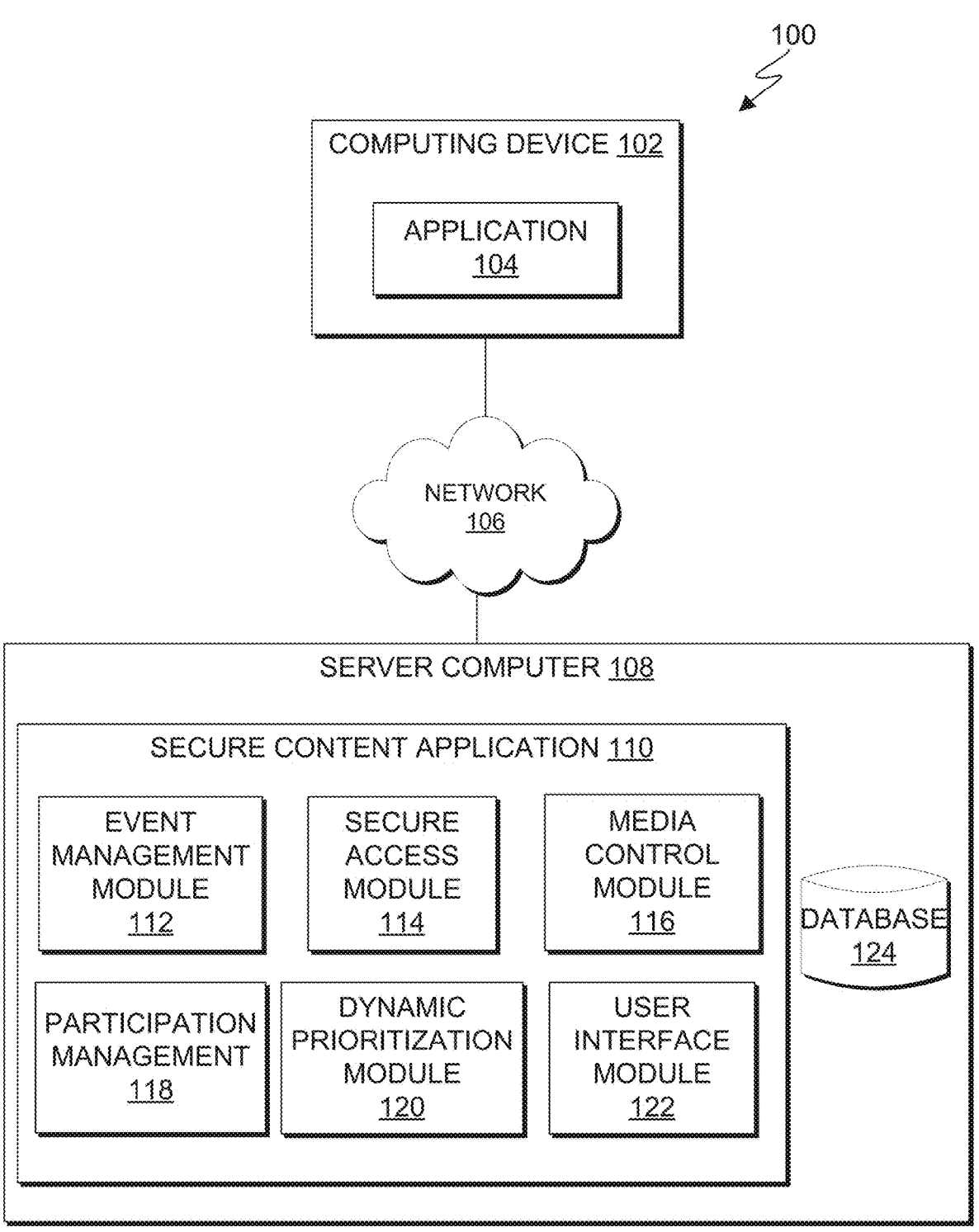
FIG. 1 functional block diagram illustrating a computing environment, in accordance with various embodiments of the systems and methods disclosed herein.

FIG. 1 is a functional block diagram illustrating an example computing environment, generally designated computing environment 100, in accordance with various embodiments of the systems and methods disclosed herein. FIG. 1 provides only an illustration of one implementation and does not imply any limitations with regard to the environments in which different embodiments may be implemented. Many modifications to the depicted environment may be made by those skilled in the art without departing from the scope of the various aspects of systems and methods disclosed herein, as recited by the claims.

Computing environment 100 includes computing device 102 and server computer 108, all interconnected over network 106. Computing device 102 and server computer 108 can be a standalone computer device, a management server, a webserver, a mobile computing device, or any other electronic device or computing system capable of receiving, sending, and processing data. In other embodiments, computing device 102 and server computer 108 can represent a server computing system utilizing multiple computers as a server system, such as in a cloud computing environment, as depicted and described in further detail with respect to FIG. 4. In another embodiment, computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, computing device 102 and server computer 108 each represent a computing system utilizing clustered computers and components (e.g., database server computers, application server computers, etc.) that act as a single pool of seamless resources when accessed within computing environment 100. In some embodiments, computing device 102 and server computer 108 are a single device. Computing device 102 and server computer 108 may include internal and external hardware components capable of executing machine-readable program instructions, as depicted and described in further detail with respect to FIG. 4.

Computing device 102 is a digital device associated on or more entities utilizing an asset management system and users thereof. Computing device 102 includes application 104. Application 104 communicates with server computer 108 to access secure content application 110 (e.g., using TCP/IP) and database 122. Application 104 can further communicate with secure content application 110 to create time bound events with event specific media permissions for media handling and event prioritization, as discussed in greater detail below. In general, application 104 can be implemented using a browser and web portal or any program that can interface with or otherwise access secure content application 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among computing device 102 and server computer 108, and other computing devices (not shown) within computing environment 100.

Server computer 108 is a digital device that hosts secure content application 110 and database 122. In this embodiment, secure content application 110 and database 122 reside on server computer 108. In other embodiments, secure content application 110 and/or database 122 can be stored locally on computing device 102. Other embodiments include secure content application 110 and/or database 122 being local to or virtually part of computing device 108. In yet other embodiments, an instance of secure content application 110 and/or database 122 can be stored on computing device 102 and can communicate with another instance of secure content application 110 residing on server computer 108. In some embodiments, secure content application 110 can be a stand-alone program on a computing device. In certain aspects of the systems and methods disclosed herein, secure content application 110 and database 122 can be cloud based, utilizing multiple computing devices, made available as a software as a service (Saas), as part of an infrastructure as a service (IaaS) system, as part of a platform as a service (PaaS), etc.

Secure content application 110 creates time bound events with event specific media permissions for media handling and event prioritization. Secure content application 110 includes event management module 112 secure access module 114, media control module 116, participation management 118, dynamic prioritization module 120, and user interface module 122. In some embodiments, secure content application 110 may be a technology platform that provides secure group-based access to sets of digital assets and allows a user to remove digital assets from the sets of digital assets from the technology platform. For example, in some embodiments, secure content application 110 may render and display on a user device, three-dimensional representations of a virtual structure containing a set of digital assets as virtual objects to allow a user to visually access and interact with virtual objects within the virtual structure, wherein the virtual objects are not accessible to the user outside of the virtual structure. The virtual structure may include multiple wings, and the set of digital assets represented as virtual objects may be contained within one of the wings.

Event management module 112 facilitates the creation, configuration, and storage of events within the secure content application. For example, when a user initiates the process to create a new event, secure content application 110 can invoke event management module 112 to provide an interface for inputting essential parameters, such as the event title, duration (e.g., start and end time), description, and specific media control parameters. As used herein, media control parameters may refer to user defined rules or settings associated with an event that define how media (such as photos or videos) may be handled by participants. These parameters are established at the time of event creation and govern actions such as uploading, downloading, saving, modifying, sharing, or deleting media within the event context. For example, within the secure content application, media control parameters may specify whether participants can download media to their local device, whether media may be saved to personal galleries, whether contributions can be deleted and by whom (e.g., only by the original creator or by the event administrator), and whether only original content captured during the event is permissible.

In response to receiving these user inputs, event management module 112 may generate a unique event identifier and compile an event record that includes all associated data (e.g., participant lists and permission settings based on the specific media control parameters. In addition to core event attributes such as title, timing, participant lists, and media permissions, an event record can store a variety of supplemental information to support robust event management and user experience. Other types of information that may be recorded include event descriptions, location details (physical or virtual), organizer identity, tags or categories for searching and filtering, notification preferences, event status (e.g., draft, active, completed), a log of participant actions, and historical audit trails for changes made to the event. Event records may also include metadata for media contributions, links to related events, custom invitation messages, password protection status, and any terms or policies governing participation. Event management module 112 may store the unique event identifier and event record in an encrypted system database (e.g., database 124). For example, when a user sets up a new event titled "Company Retreat," scheduled to run from Friday to Sunday, event management module 112 may encode this timeline (i.e., duration of for which the event is active), link the designated participants, and may apply specific media control parameters to control sharing and access throughout the event.

Secure access module 114 may provide authentication and access control functionalities to authorized users for specific events. In response to receiving an indication that an event has been created, secure access module 114 may generate unique, event-specific access codes (e.g., QR codes or secure links) that encode event metadata and permissions. Secure access module 114 may then distribute these access codes to invited participants via secure messaging or notification channels.

When a participant engages with the access code, secure access module 114 may initiate several validation checks.

For example, in response to a user engaging with an access code, secure access module 114 may verify the user's identity against stored credentials and confirms their invitation status for the selected event. Secure access module 114 may then determines whether secure content application 110 is installed on the participant's device. In response to determining that secure content application 110 is installed on the participant's device, secure access module 114 may automatically launch secure content application 110 and navigate the user directly to the relevant event interface.

Conversely, in response to determining that secure content application 110 is not installed in the participant's device, secure access module 114 may redirect the user to a download link. Continuing the example above, for the event titled, the "Company Retreat," secure access module 114 may distribute QR codes to all attendees. When an employee scans the code, secure access module 114 may verify the employee's credentials and either launches the secure content application directly to the retreat event interface or direct the employee to a download link.

Media control module 116 may enforce specific media control parameters for the event during the time interval for which the event is active. Media control module 116 may enable users to upload photos and videos directly from their device camera roll or capture new media instantly through the application's built-in camera functionality. Media control module 116 may also enforce event-specific media control parameters regarding uploading, downloading, deletion, and sharing of media, as determined during event setup. In some embodiments, in response to receiving a media submission, media control module 116 may determine if the submission complies with permitted actions (e.g., only allowing original photos taken during the event), uploading approved files in the event gallery and rejecting and/or deleting unauthorized content. For example, during the "Company Retreat," employees snap photos throughout the day and each submission is automatically vetted by media control module 116. For example, in response to receiving specific media control parameters for the event that specify that only original images may be uploaded, media control module 116 may determine each received image is original before uploading the received media to the event. In certain embodiments media control 116 may, in response to determining a participant performs an action that is not in compliance with event specific media parameters, delete or otherwise prevent the user from viewing and/or interacting with the respective media. For example, a user may specify that pictures may not be copied and/or shared to others outside of the participant list. In response to a user trying to share the picture outside of the participant list, media control module 116 may prevent the user from interacting with the respective media by obfuscating the media file from the user's view. In another example, an event creator may specify that screenshots of media may not be allowed. In response to determining that a user has executed a screenshot command, media control module 116 may prevent the user from viewing that media file.

Participant management module 118 may manage user roles and associations with events and maintains an up-to-date registry of participants. During event creation, the event creator may selects an intended participant list using a user interface of secure content application 110. Participants may include direct connections, organizational groups, or external guests. Participant management module 118 may further track invitation statuses, manage roles (e.g., admin, viewer, contributor), and coordinate notifications for event-related activities. Continuing the example above, for the retreat scenario, staff may specify all employees as participants, some as event administrators, and invite a guest speaker as a limited access contributor. Participant management module 118 may then send invitations, track RSVP responses, and ensure each user has access rights corresponding to their assigned role in the event.

Dynamic prioritization module 120 may analyze event activity and relevance. It monitors critical parameters such as recency of posts, level of interaction, and upcoming timelines to prioritize the display of active events over older or less relevant ones. In response to receiving an indication that secure content application 110 has been launched by a participant, dynamic prioritization module 120 may evaluate the set of active events associated with that user according to predetermined display rules. Specifically, dynamic prioritization module 120 may determines whether the participant is associated with only one active event. In response to determining that the participant is associated with only one active event, then dynamic prioritization module 120 may automatically highlight and display that event to the user. In response to determining that the participant is associated with more than one active event, then, dynamic prioritization module 120 may determine to select a most recently created event or the event with the highest activity level (e.g., based on frequency of media uploads or user interaction).

For example, during a busy weekend when an employee is invited to both a "Company Retreat" and a "Product Launch," upon opening secure content application 110, dynamic prioritization module 120 may assess which event is most relevant and display the retreat if it is the newest event, or the product launch if it has higher user activity.

User interface module 122 may serve as the primary interaction layer between users and secure content application 110, integrating all backend functionalities in a seamless, intuitive display. In this embodiment, user interface module 112 may presents options for event creation, media upload, access code scanning, and event feed browsing. User interface module 122 may support rich user input (e.g., captions, tags), real-time notifications, and dynamic content rendering for active events. For the "Company Retreat," employees launch the application, are greeted by a clean dashboard listing all their active events, select the relevant retreat event, and instantly see a chronological feed of photos and videos uploaded by themselves and others, reflecting the permissions and organizational structure established by the underlying modules.

In some embodiments, secure content application 110 incorporates one or more artificial intelligence modules automatically analyze all photos and videos contributed by participants during an event. The AI module may utilize computer vision algorithms and event heuristics to identify highlights, such as moments with peak group activity, recognize faces, scenes, or specific event themes. Upon completion of the time bound events, users can invoke an "AI Highlights" mode from event management module 112, triggering secure content application 110 to process media files, rank and select key moments, and generate a curated highlight reel as an automatically composed video or a set of featured images.

In another embodiment, secure content application 110 enables flexible media organization and viewing modes for completed time bound events. In these embodiments, secure content application 110 may store all uploaded media from a created time saved Gala is stored persistently, indexed by event metadata such as chronological order, contributing participants, and user-applied tags. Users can choose to view the event in "Album Mode," which presents all photos and videos in grid or gallery format, supporting sorting and filtering (e.g., by date, uploader, media type). Alternatively, users can select a "Timeline View," which replays the event's content in the actual order it was contributed, mimicking the real-time progression of the gathering. This timeline may include caption overlays, reactions, and contextual notifications as they occurred live, offering an immersive recap of the event.

In general, database 122 can be implemented using any non-volatile storage media known in the art. For example, database 122 can be implemented with a tape library, optical library, one or more independent hard disk drives, or multiple hard disk drives in a redundant array of independent disk (RAID). In this embodiment database 122 is stored on server computer 108. In other embodiments, database 122 can be stored on other computing devices (not shown) or can be a combination of one or more other databases that has given permission access to secure content application 110.

FIG. 2 is a flowchart 200 depicting an example of operational steps for controlling media contributions for an event during a defined time interval, in accordance with various embodiments of the systems and methods disclosed herein.

In step 202, secure content application 110 receives user input for creating an event having a defined time interval during which the event is active and one or more event specific media control parameters. In this embodiment, secure content application 110 may present a user interface that enables users to initiate the creation of an event, such as a gala, directly from a dashboard interface of secure content application 110 or through an icon tray menu. For example, in response to receiving a user selection to "Create an Event" (e.g., to create a gala), secure content application 110 may display a structured input form requiring essential event parameters, including a mandatory title or name, a description, and a predefined time interval specifying the duration of the event. In this embodiment, the duration of the event may be minutes, hours, one day, one week, one month, with options for custom start or end dates/times). In other embodiments, the event duration may be permanent but with a specified time interval for which the event is "live." The form may also include dynamic toggles for event-specific media control parameters, such as whether media is downloadable or savable directly to a user's camera roll, automatic uploads from a camera to the event without having to access secure content application 110 during the time period for which the event is active, and options to set password protection or participant restrictions. As the user completes these selections, the secure content application 110 may save these selections in a secure database (e.g., database 124) and may apply default settings where needed (e.g., immediate start time if no start is specified).

In step 204, secure content application 110 generates an event record for an event based on the defined time interval and the one or more event specific media control parameters. In this embodiment, in response to receiving one or more user selections, secure content application 110 may utilize event management module 112 to generate an event record. As stated above, the event record may include all provided parameters: the event's unique identifier, title, defined time interval, participant list (with added or canceled invites managed through QR codes, secure links, or text invites), and event specified media control parameters (such as upload/download permissions, permissions to save media content, password status, and deletion rules).

In step 206, secure content application 110 control media contributions for the event during the defined time interval and the one or more event specific media control parameters. For example, when an authorized participant submits media, whether by uploading files from the device's gallery or by capturing content directly within the application, secure content application 110 may leverage media control module 116 to evaluate each submission against the event's stored media control parameters. These parameters may include rules governing permissions for downloading (such as whether members can save files to their devices or may only view them within the gala feed), gallery saving (determining if media can be stored in user-specific collections like an event album or private folders), and deletion protocols (which specify whether only the original creator or an admin can remove shared content, rejecting unauthorized removal attempts). Additional considerations include time-based restrictions, which ensure that uploading, modifying, or deleting media is allowed only within the event's designated window and that contributions become locked or viewable after expiration according to defined rules. Media control module 116 may also evaluate content-based restrictions, such as verifying that all contributed media is original and generated by the participant during the event's live interval and may automatically delete or flag items that do not meet this requirement to maintain authenticity. In response to receiving a submission, media control module 116 enforces these parameters in real time, permitting only validated content to be uploaded, while rejecting or purging duplicates or unauthorized uploads to uphold strict event curation.

To further enhance user engagement and experience, secure content application 110 supports dynamic display functionality. For example, when a participant launches the application using an event-specific access code, secure content application 110 may prioritize and highlight the relevant event above others in the interface. In response to determining that the participant is associated with multiple events, secure content application 110 may apply display rules such as showing the most recent event or the one with the highest level of user activity, including media uploads, comments, or reactions, to surface priority content.

The platform remains continually event-aware by monitoring activity parameters including event activation, new media uploads, and event expiration. Upon detection of these activities, secure content application 110 may generate and deliver notifications to all participants. For instance, when a participant uploads a photo to a gala during its active period, secure content application 110 may notify all users and updates the interface to display the new content at the top of the feed. Throughout every stage of participation, secure content application 110 ensures that only eligible actions are permitted and that every interaction complies with the event's defined controls, thereby enhancing event privacy, and security of shared media.

Figure 3:
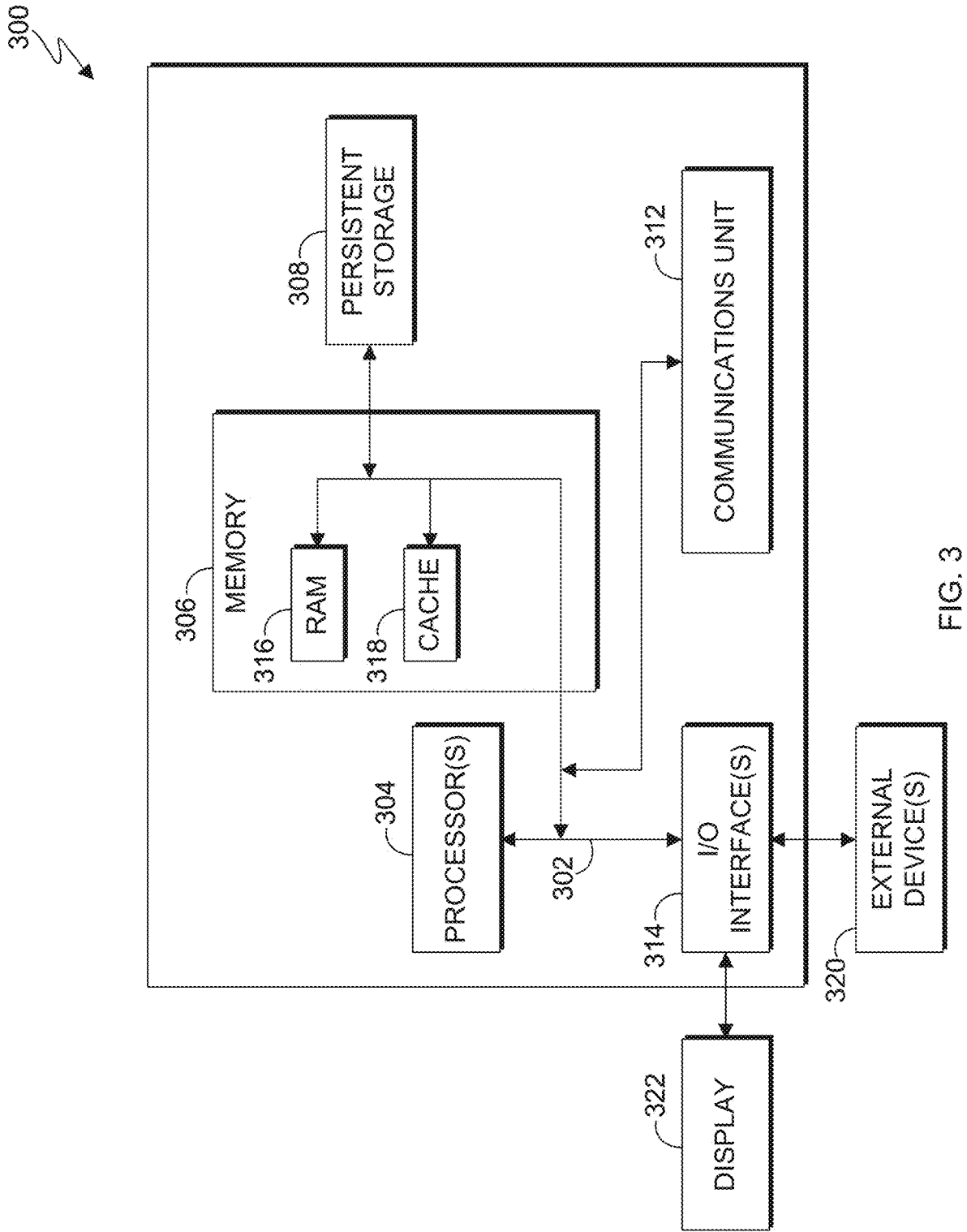
FIG. 3 depicts a block diagram of components of the computing systems of FIG. 1, in accordance with various embodiments of the systems and methods disclosed herein.

FIG. 3 depicts a block diagram of components of computing systems within computing environment 100 of FIG. 1, in accordance with an aspect of the systems and methods of the present disclosure. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment. However, it should be appreciated that any particular program nomenclature herein is used merely for convenience, and thus aspects of the systems and methods disclosed herein should not be limited to use solely in any specific application identified and/or implied by such nomenclature.

Computer system 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Secure content application 110 (not shown) may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Secure content application 110 may be downloaded to persistent storage 308 through communications unit 310.

I/O interface(s) 312 allows for input and output of data with other devices that may be connected to computing device 102 and server computer 108. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice aspects of the present disclosure can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Aspects of the various systems and methods may be a system, a method, and/or a computer program product (CPP). Various aspects of the disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Aspects of the systems and methods of the present disclosure are described herein with reference to flowchart illustrations and/or block diagrams of methods, apparatus (systems), and computer program products according to aspects of the various systems and methods disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the systems and methods of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the systems and methods of the present disclosure have been presented for purposes of illustration but are not intended to be exhaustive or limited to the embodiments disclosed. Many modifications and variations will be apparent to those of ordinary skill in the art without departing from the scope and spirit of aspects of the present disclosure. The terminology used herein was chosen to best explain the principles of the embodiment, the practical application or technical improvement over technologies found in the marketplace, or to enable others of ordinary skill in the art to understand the embodiments disclosed herein.

FIG. 4 depicts an alternate computing environment 400 illustrating components of computer 401 in accordance with an alternate embodiment. It should be appreciated that FIG. 4 provides only an illustration of one implementation and does not imply any limitations with regard to the environments in which different embodiments may be implemented. Many modifications to the depicted environment may be made.

Computing environment 400 contains an example of an environment for the execution of at least some of the computer code involved in performing the inventive methods, such as creating time bound events with event specific media permissions for media handling and event prioritization, the method being performed by one or more processors programmed with program instructions which, when executed, cause the one or more processors to perform the steps of: providing a user interface of a secure content application which a user can create a new event specifying a defined time interval during which the event is active and one or more event-specific media control parameters; in response to the user creating the event, generating an event record comprising at least an event identifier, an associated title for the event, a timing attribute, a participant list, and the event-specific media control parameters; and controlling media contributions from users during the defined time interval in which the event is active and in accordance with one or more event-specific media control parameters, by enabling (i) the upload of single or multiple media files selected from a device's camera roll and (ii) direct capture and upload of photos or videos from the device's camera into an event feed of the event, wherein the media contributions are permitted or restricted based on the event-specific media control parameters.

In addition to secure content application 110, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and secure content application 110, as identified above), peripheral device set 414 (including user interface (UI), device set 423, storage 424, and Internet of Things (IOT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip". In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in member key program 410 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in secure content application 110 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

Secure content application 110 is a program, a subprogram of a larger program, an application, a plurality of applications, or mobile application software, which functions to provide a unified solution that can provide a unified solution to provide context based management of a plurality of assets. In various embodiments, secure content application 110 may implement the following steps: for creating time bound events with event specific media permissions for media handling and event prioritization, the method being performed by one or more processors programmed with program instructions which, when executed, cause the one or more processors to perform the steps of: providing a user interface of a secure content application which a user can create a new event specifying a defined time interval during which the event is active and one or more event-specific media control parameters; in response to the user creating the event, generating an event record comprising at least an event identifier, an associated title for the event, a timing attribute, a participant list, and the event-specific media control parameters; and controlling media contributions from users during the defined time interval in which the event is active and in accordance with one or more event-specific media control parameters, by enabling (i) the upload of single or multiple media files selected from a device's camera roll and (ii) direct capture and upload of photos or videos from the device's camera into an event feed of the event, wherein the media contributions are permitted or restricted based on the event-specific media control parameters.

In another embodiment, the functionality of secure content application 110, or any combination programs thereof, may be integrated into a single software program. In some embodiments, secure content application 110 may be located on separate computing devices (not depicted) but can still communicate over WAN 402. In various embodiments, client versions of secure content application 110 resides on any other computing device (not depicted) within computing environment 400. In the depicted embodiment, secure content application 110 includes model 452 and can leverage model 452 to monitor a plurality of assets for compliance with asset related documentation and detecting a change to the one or more assets of the plurality that deviate from parameters associated with the asset related documentation.

Model 452 is representative of a model utilizing deep learning techniques to train, calculate weights, ingest inputs, and output a plurality of solution vectors. In an embodiment, model 452 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 452 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 452 is a recurrent neural network (RNN) trained utilizing supervised training methods.

Aspects of the present disclosure may contain various accessible data sources, such as database 454, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Secure content application 110 may provide informed consent, with notice of the collection of personal data, allowing the user to opt in or opt out of processing personal data. Consent can take several forms: opt-in consent imposes on the user to take an affirmative action before the personal data is processed, alternatively, opt-out consent imposes on the user to take an affirmative action to prevent the processing of personal data before the data is processed. Secure content application 110 enables the authorized and secure processing of user information, such as tracking information, as well as personal data, such as personally identifying information or sensitive personal information. Secure content application 110 may provide information regarding the personal data and the nature (e.g., type, scope, purpose, duration, etc.) of the processing. Secure content application 110 may provide the user with copies of stored personal data. Secure content application 110 may allow the correction or completion of incorrect or incomplete personal data. Secure content application 110 may allow the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Figures 5A, 5B:
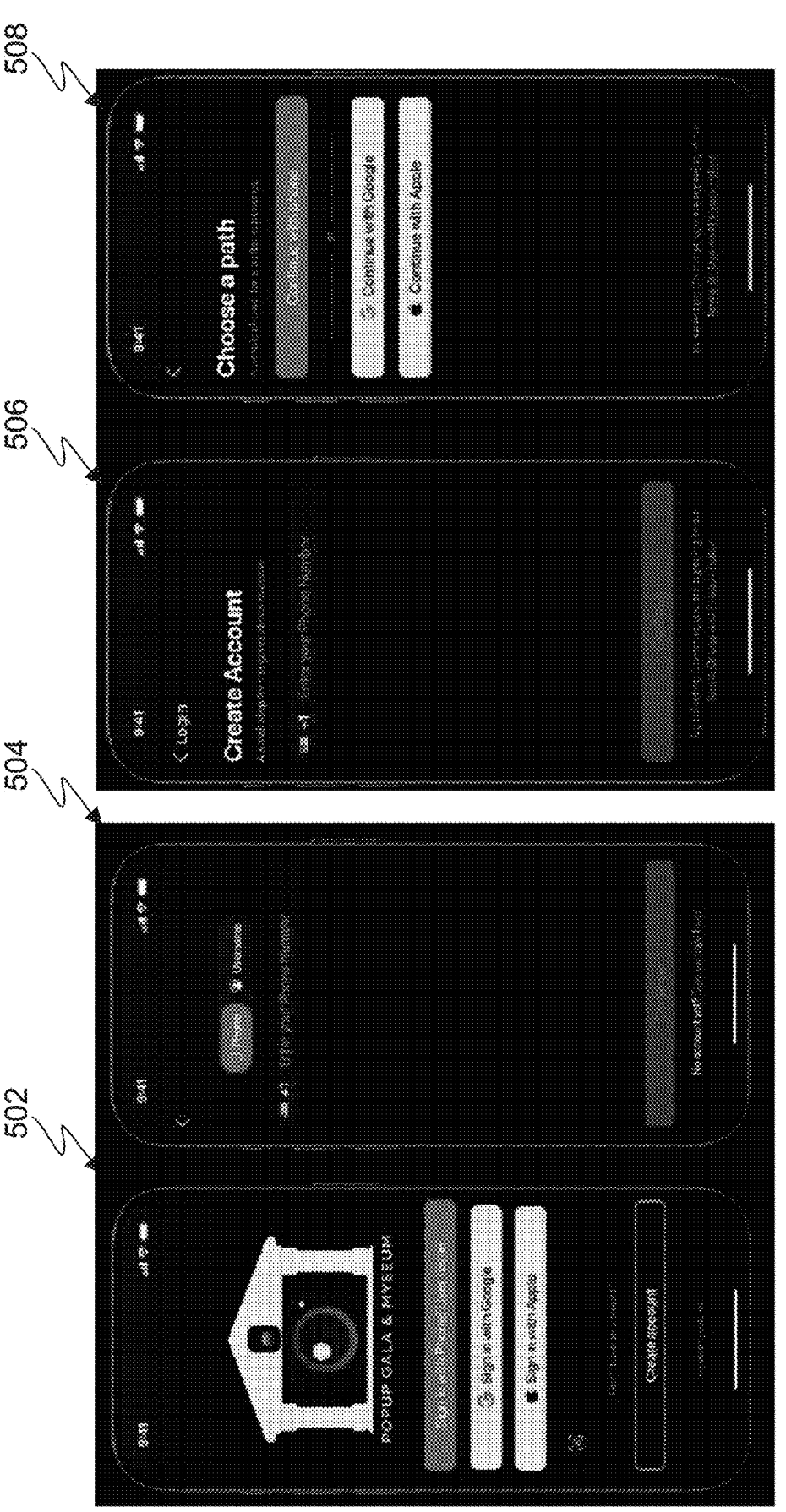
FIGS. 5A-5G depict example user interface that illustrate various functions for controlling media contributions for an event during a defined time interface, in accordance with various embodiments of the systems and methods disclosed herein.

FIG. 5A illustrates the manner in which secure content application 110 generates and presents login authentication interfaces to a user device, shown through example interfaces 502 and 504. These interfaces are managed by user interface module 122 of secure content application 110 and are specifically configured to facilitate secure access prior to event participation or media contribution.

In example interface 502, secure content application 110 presents a login authentication screen that enables users to sign in either with an existing username associated with the application or through integration with various supported authentication services. This interface displays selectable input fields or buttons which may trigger external open authorization providers (e.g., OAuth providers), federated identity validation, or proprietary secure login workflows native to secure content application 110. Upon user entry, secure access module 114 receives the authentication vector and performs credential validation by securely transmitting credentials to the backend, returning context-appropriate access tokens upon successful validation. Example interface 502 displays authentication options based on event-specific security configuration, adapting logic for multi-factor authentication, password requirements, or integration with organizational single sign on policies as defined for each event or user.

Example interface 504 illustrates an example authentication workflow allowing participants to sign in using a registered phone number which is already associated with the user's account in secure content application 110. This interface displays an input field for phone number entry and, upon submission, initiates a secure validation flow through secure access module 114, which may involve transmission of a one-time passcode or two-factor verification sent via SMS or other secure messaging protocols. Backend systems cross-reference the provided phone number with the pre-registered participant record mapped to one or more active events, and upon successful identity confirmation, provision access to event-specific content and interactions granted by the relevant media control parameters.

FIG. 5B displays example user interfaces 506 and 508, as generated and presented to a user device by secure content application 110, for facilitating account creation and onboarding of new users. These interfaces are instantiated by user interface module 122 and are designed to accommodate a range of registration workflows to support secure and flexible access for event participation and media management.

Example interface 506 is configured to allow a user to create a new account using their telephone number. The interface renders an input field for entry of a valid phone number, which is subsequently transmitted to secure access module 114 for validation against existing user records or for new profile instantiation. Upon receipt of the phone number, secure access module 114 initiates an authentication protocol such as sending a verification code via SMS or secure messaging channel to validate the user's ownership of the telephone number. Once confirmed, secure content application 110 proceeds to create a new user record in the underlying encrypted database, mapping the phone-based identity to any subsequent event invitations or permissions.

Example interface 508 presents alternative account creation options, enabling a user to establish an account using methods such as direct email registration or by leveraging existing credentials with third-party identity providers. Example interface 508 displays selectable controls for standard sign-up which may include entering an email address, creating a password, and accepting relevant privacy or consent terms and may provide dedicated buttons allowing users to authenticate and create accounts using federated identity credentials offered by external authentication services. These external authentication flows (e.g., OAuth or OpenID Connect) interface between secure content application 110 and the user's third-party identity provider. Upon successful validation, secure content application 110 creates a new user record and links the new user record to the authenticated provider, granting access to event spaces as dictated by role assignments and permission structures managed by participant management module 118.

Figures 5C, 5D, 5E:
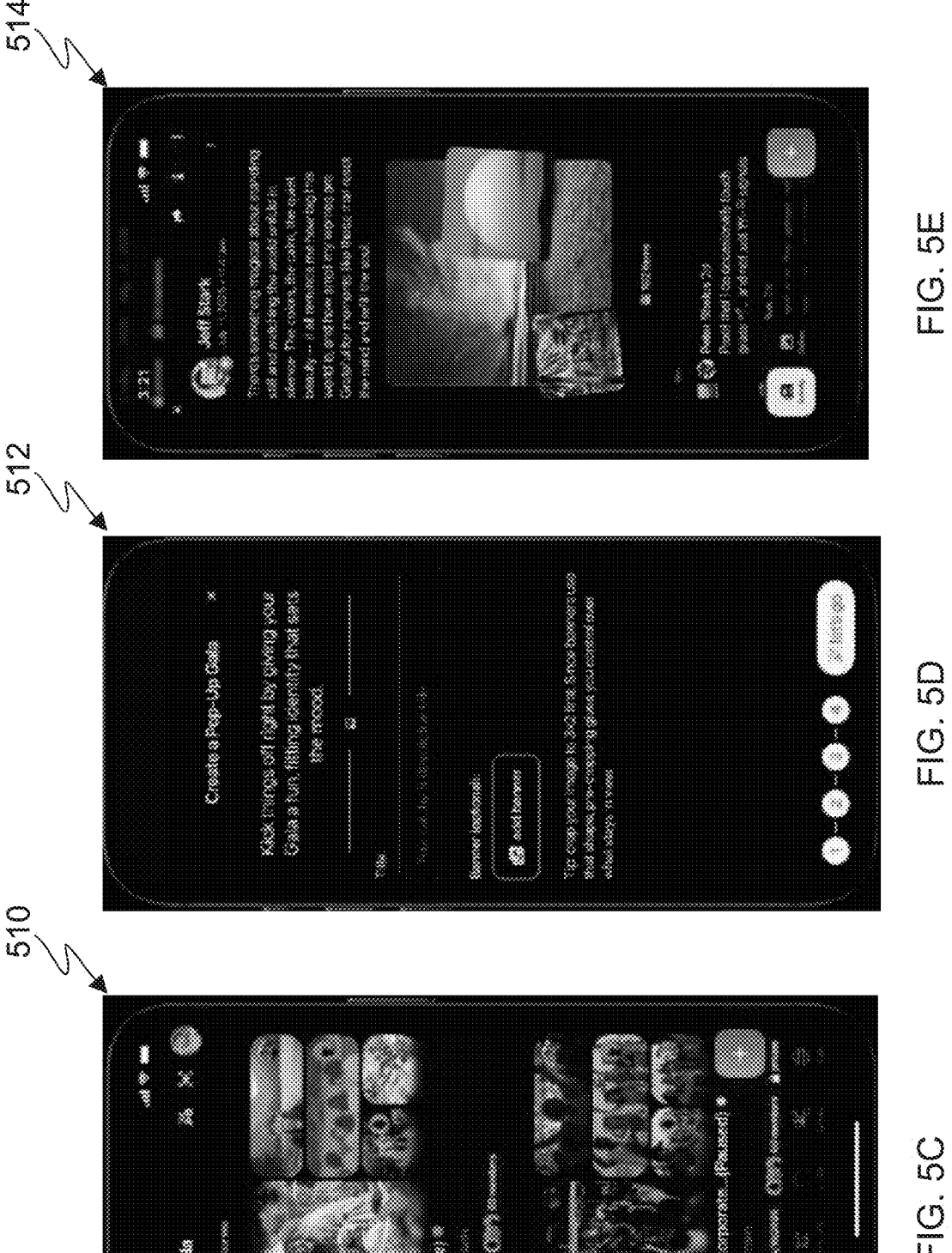

FIG. 5C illustrates example interface 510, which represents an event preview and management dashboard within secure content application 110. Upon successful user login, secure content application 110 redirects the user to this event preview page, dynamically generated and rendered by user interface module 122 to provide access to the user's current time-bound event (e.g., pop-up gala).

The central display area prominently features the active event to which the user is currently associated. Here, a visually arranged gallery showcases the latest media contributions, with thumbnails or previews representing photos and videos uploaded by participants. Adjacent to the media gallery, a graphic visual indicator highlights the event status, such as a badge or banner denoting when the event, titled "Picnic," is live, and also displays the live event duration or scheduled date for user reference. Example interface 510 includes a display of the most recent user to add media to the event and optionally presents a timestamp of the latest upload. A dedicated graphic icon visually indicates the number of current event members.

Example interface 510 streamlines navigation and user actions with an "Upcoming" button or similar selector positioned prominently, enabling one-click transitions to previews of future pop-up galas. Additional tabs or sections allow users to toggle between current and past time-bound events, with past event summaries accessible for archival viewing or media download, as permitted by the event's media control parameters.

At the bottom of the interface, a row of interactive graphic icons serves as a universal navigation bar, offering direct access to other application modules. These icons may include, for instance, a pop-up gala creation shortcut, an interface for viewing media assets as virtual objects, a home/dashboard icon, a gallery button for browsing all accessible media, and a map button for reviewing event locations or geotagged content. Each icon is linked to corresponding backend logic within secure content application 110.

FIG. 5D illustrates example interface 512, which is generated and presented to the user by secure content application 110 via the user interface module, facilitating the creation of a new time-bound event (i.e., a pop-up gala). In this workflow, interface 512 serves as an interactive form through which users can define event attributes and initialize event configuration.

Example interface 512 displays an input field designated for specifying the Title of the event. This input is required and captured by event management module 112, which utilizes it as a key attribute in generating the corresponding event record and event identifier. In addition to basic event metadata, example interface 510 further enhances event customization by incorporating a selectable button configured for importing a media file, (e.g., a photo), to serve as the event banner. When the user selects this button, the system invokes the user's local file browser or device camera roll, enabling the user to select and upload of the desired banner image. Upon selection, the chosen media file is securely transmitted to server computer 108 where it is stored in association with the active event record, providing a visual anchor for participants during subsequent interactions.

Example interface 512 may further be configured to allow to input additional event parameters as required, such as prompts to input start and end times (e.g., defining the time window during which event-specific media permissions apply), as well as options for importing participant lists, setting access controls, or configuring event-specific media control parameters (e.g., download and deletion permissions). All data entered or media imported through interface 512 is validated for compliance and securely persisted in encrypted storage, ensuring integrity of event setup.

FIG. 5E illustrates example interface 514, presenting the interactive newsfeed view for a time bound event within secure content application 110. This dynamically generated interface serves as the central hub for participants to engage with event media and social activity in real time, tightly integrating user-generated content, reactions, and collaboration features in alignment with the event's media control parameters.

Within interface 514, the primary display area renders a vertically arranged, scrollable feed of posts contributed by event members. Each feed item displays media content such as images or videos uploaded by participants, with media thumbnails or previews occupying prominent positions. In this example, a notable post from Jeff Stark is shown, indicating a substantial media contribution (e.g., 192 items) and an accompanying textual comment enhancing the narrative context. Posts from additional users are also visible in chronological or activity-prioritized order.

Associated with each post are a suite of interactive graphic icons enabling users to take action on event media. An arrow icon facilitates sharing content according to permissions; an "i" icon reveals more details about the post, such as upload time, media metadata, or content origin; a three-dot menu provides access to further actions like reporting content, managing notifications, or additional event-specific operations. Users can view post comments, add their own reactions or replies, and interact with reaction buttons (such as likes or emojis), supporting real-time feedback.

At the base of interface 514 is a persistent navigation bar with graphic icons dedicated to view filtering and content upload. A filter icon allows toggling between "activity" view (showing the latest posts and interactions) and "gallery" view (e.g., a media-centric, gallery-style arrangement). The plus sign ("+") icon enables the user to quickly upload new media or contributions, invoking media control module 116 for compliance with event upload policies. All uploads, comments, and reactions are immediately reflected in the feed through live updates orchestrated by the user interface module and media control module 116, ensuring synchrony for all event participants.

Figures 5F, 5G:
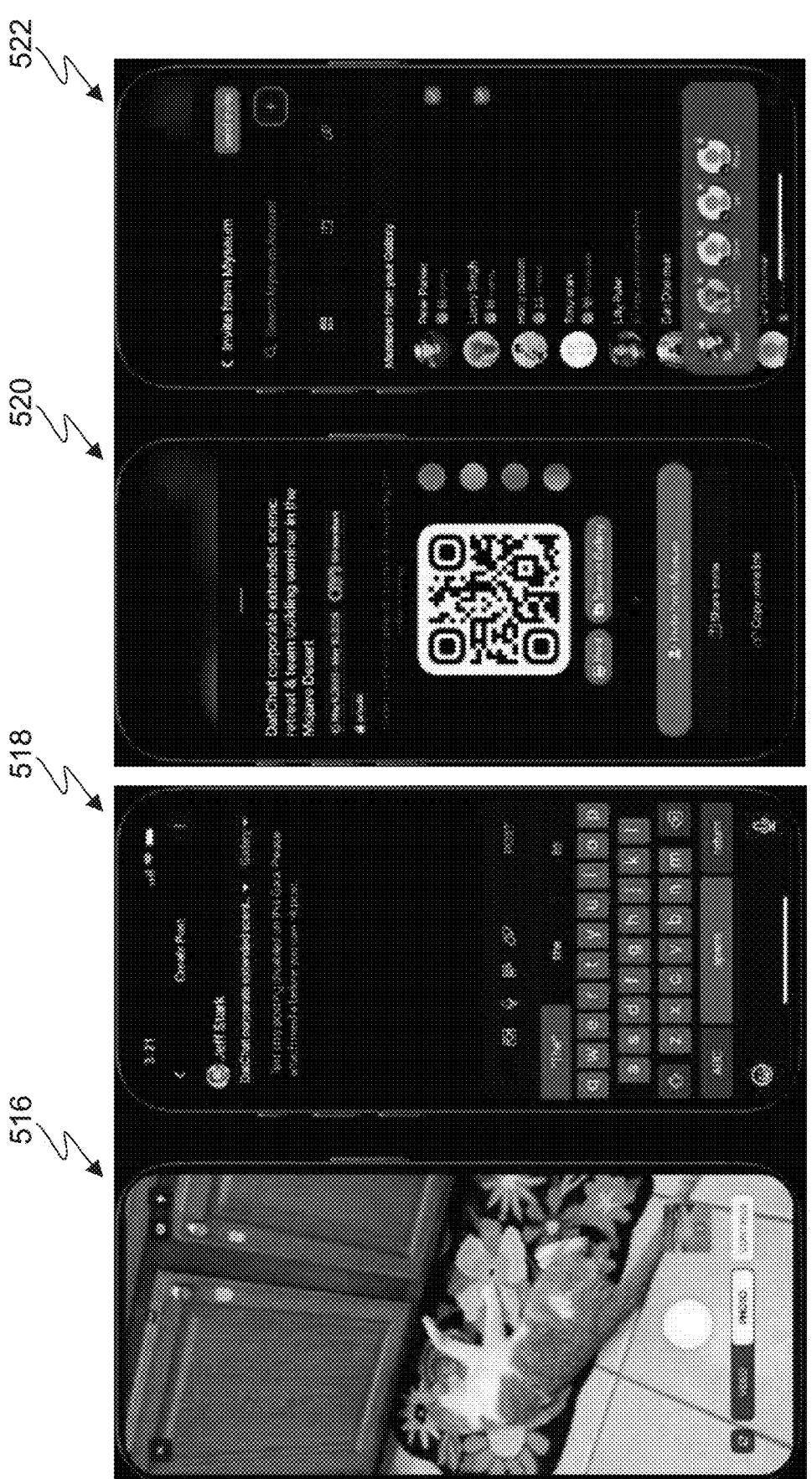

FIG. 5F illustrates example interfaces 516 and 518 within secure content application 110, guiding users through the process of generating and sharing posts with media content for a time bound event.

Example interface 516 provides a robust in-app camera experience designed for seamless content creation. Example interface 516 incorporates a live camera view with controls for toggling between photo and video capture modes, allowing the user to select the desired media type for their post. Users may switch between front and rear-facing cameras via a dedicated toggle button, and activate or deactivate the flash as needed for optimal image quality. A circular graphic icon representing the capture button is used to take a photo or start/stop recording a video. After the capture, secure content application 110 generates a preview thumbnail. An adjacent "Continue" button enables the user to progress to additional editing or uploading steps. Example interface 516 is configured to support capturing multiple photos or videos in one session, streamlining multi-asset post creation in direct association with a live event.

Example interface 518 is configured to create a user post. In this example, the user, Jeff Stark, interacts with a gallery title dropdown (e.g., "Datchat corporate extended scenic retreat & team building seminar in the Mojave Desert") and may switch gallery views (e.g., gallery drop down menu) using the available dropdowns. The display displays pre-populated text that highlights current media control parameters: if an event admin has disabled text-only posts (as in this scenario), an on-screen message notifies the user (e.g., "Please attach media before you can hit post"), and the "post" action is locked until eligible media files are added. Example interface 518 includes a text input area showing the mobile keyboard for adding captions, along with rich text formatting tools to customize descriptions or commentary accompanying each media asset, and options to upload media from camera roll, activate the device camera, or record an audio recording. Users access their camera roll to select multiple files, or utilize photos and videos captured in real time via the in-app camera.

Throughout this workflow, secure content application 110 actively enforces all event-specific media permissions through the media control module. For example, when a user attempts to create a post, the application validates that the submission complies with event admin-set restrictions (such as prohibiting text-only contributions or limiting media type/quantity). Media and text are securely processed and, upon approval, uploaded to the event's feed, ensuring compliant, context-aware event participation.

FIG. 5G depicts example interfaces 520 and 522 which allow users to add participants to a created time bound event. These interfaces are dynamically rendered by user interface module 122.

Example user interface 520 presents a centralized invitation dashboard for the time bound event, in this case labeled "DatChat corporate extended scenic retreat & team building seminar in the Mojave Desert." Example user interface 520 displays a unique, auto-generated QR code associated with the time bound event. Onscreen metadata includes the event's name, live date range, security designation (such as "private"), and the current member count as tracked by participant management module 118. Example user interface 120 provides users with multiple actionable options: a button to print the QR code for physical distribution, a save-to-gallery button to store the QR code on a device, a share button that utilizes the device's sharing framework for rapid dissemination, a button to copy the event's unique invite link for use in external communications, and a dedicated button to initiate the "invite contacts" workflow from a linked content application.

Example interface 522 is presented when a user chooses to invite contacts from a linked content application (e.g., Myseum). This interface features a search input for filtering contacts by name or attribute, supporting efficient selection from potentially large user bases. Below the search bar, a list of contacts from the linked application is displayed, each with a selectable check mark to indicate invitation status; toggling the check mark adds or removes users from the invitation list in real time. Quick-access graphic icons allow users to immediately view the event QR code, share the invitation through device-native mechanisms, or copy the invite link-streamlining communication. At the bottom, a horizontal overlay graphically represents all currently selected invitees, providing instant visual confirmation and easy management of the invitation list prior to sending. Upon confirmation, participant management module 118 updates the event registry to reflect invited members, and secure access module 114 prepares and transmits secure, personalized invitations to each selected contact through the appropriate channel.

What is claimed is:

1. A computer-implemented method for creating time bound events with event specific media permissions for media handling and event prioritization, the method being performed by one or more processors programmed with program instructions which, when executed, cause the one or more processors to perform the steps of:

providing a user interface of a secure content application with which a user can create an event specifying a defined time interval during which the event is active and event-specific media control parameters;

in response to the user creating the event, generating an event record comprising at least an event identifier, an associated title for the event, a timing attribute, a participant list, and the event-specific media control parameters; and controlling media contributions from members of the participant list during the defined time interval in which the event is active and in accordance with the event-specific media control parameters, by enabling (i) an upload of single or multiple media files selected from a device's camera roll and (ii) direct capture and upload of photos or videos from the device's camera roll into an event feed of the event, wherein the media contributions are permitted or restricted based on the event-specific media control parameters.

2. The computer-implemented method of claim 1, further comprising:

generating an event-specific access code that encodes information accessing the event;

associating the event-specific access code with the members of the participant list; and sending the event-specific access code to the members of the participant list; and in response to a member of the participant list accessing the event-specific access code, during the defined time interval when the event is active, determining whether the secure content application is already installed; and in response to determining that the secure content application is already installed, launching the secure content application and display media associated with the event for which the member was invited.

3. The computer-implemented method of claim 2, further comprising:

in response to determining that the secure content application is not already installed, directing the member to a link to download the secure content application.

4. The computer-implemented method of claim 2, further comprising:

upon user launch of the secure content application using the event-specific access code, highlighting or prioritizing a display of media associated with the event for which a member of the participant list was invited, above other active or past events.

5. The computer-implemented method of claim 1, further comprising:

providing, within the secure content application, a user interface comprising one or more selectable portions that display a list of active live events associated with the user; and in response to receiving a user selection of an active event and creating media within the application, automatically uploading the created media to the event during the defined time interval for which the event is active.

6. The computer-implemented method of claim 1, further comprising:

receiving, during the defined time interval when the event is active, media content submitted directly from the secure content application by a member of the participant list;

in response to receiving the media content, determining whether the media content satisfies the event-specific media control parameters, the event-specific media control parameters comprising one or more of: permitting or restricting downloading of media by the members of the participant list, allowing or preventing saving of media to user events, specifying deletion protocols, and imposing time-based or content-based restrictions on access or modification of the media; and in response to determining that the media content satisfies the event-specific media control parameters during defined time interval when the event is active, uploading the media content for access by the members of the participant list.

7. The computer-implemented method of claim 6, further comprising:

determining whether media content is not original content generated by the member of the participant list; and in response to determining that the media content is not original content generated by the member of the participant list, deleting the media content from the event.

8. The computer-implemented method of claim 1, further comprising:

detecting a predetermined activity parameter that indicates an activation of the event, receipt of new media uploaded to the event, or an expiration of the event; and in response to detecting predefined event activities, generating and transmitting notifications to the members of the participant list during defined time interval when the event is active.

9. The computer-implemented method of claim 1, further comprising:

dynamically displaying, upon launch of the secure content application by a member of the participant list, an active event associated with the member according to one or more predetermined display rules, wherein the predetermined display rules comprise:

determining whether the member is associated with more than one event;

in response to determining the member is associated with only one event, automatically displaying the active event; and in response to determining the member is associated with more than one event, applying a prioritization rule to determine which event to display, the prioritization rule including at least one of: selecting a most recently created event or the event with a highest activity level.

10. The computer-implemented method of claim 1, further comprising:

detecting user activity or new content within a particular event during defined time interval when the event is active; and in response to detecting user activity or new content within a particular event, dynamically displaying on the secure content application, content associated with the event based on one or more predetermined activity parameters.

11. The computer-implemented method of claim 1, wherein a secure content application is a technology platform that provides secure group-based access to sets of digital assets and allows a user to remove digital assets from the sets of digital assets from the technology platform.

12. A computer program product for creating time bound events with event specific media permissions for media handling and event prioritization, comprising:

one or more processors and one or more computer readable storage media storing program instructions, that when executed by the one or more processors, cause the one or one or more processors to:

provide a user interface of a secure content application with which a user can create an event specifying a defined time interval during which the event is active and event-specific media control parameters;

in response to the user creating the event, generate an event record comprising at least an event identifier, an associated title for the event, a timing attribute, a participant list, and the event-specific media control parameters; and control media contributions from members of the participant list during the defined time interval in which the event is active and in accordance with the event-specific media control parameters, by enabling (i) an upload of single or multiple media files selected from a device's camera roll and (ii) direct capture and upload of photos or videos from the device's camera roll into an event feed of the event, wherein the media contributions are permitted or restricted based on the event-specific media control parameters.

13. The computer program product of claim 12, wherein the one or more processors executing the program instructions are further caused to:

generate an event-specific access code that encodes information accessing the event;

associate the event-specific access code with the members of the participant list; and send the event-specific access code to the members of the participant list; and in response to a member of the participant list accessing the event-specific access code, during the defined time interval when the event is active, determine whether the secure content application is already installed; and in response to determining that the secure content application is already installed, launch the secure content application and display media associated with the event for which the member of the participant list was invited.

14. The computer program product of claim 13, wherein the one or more processors executing the program instructions are further caused to:

in response to determining that the secure content application is not already installed, direct the member of the participant list to a link to download the secure content application.

15. The computer program product of claim 12, wherein the one or more processors executing the program instructions are further caused to:

provide, within the secure content application, a user interface comprising one or more selectable portions that display a list of active live events associated with the user; and in response to receiving a user selection of an active event and creating media within the application, automatically upload the created media to the event during the defined time interval for which the event is active.

16. The computer program product of claim 12, wherein the one or more processors executing the program instructions are further caused to:

receive, during the defined time interval when the event is active, media content submitted directly from the secure content application by the members of the participant list;

in response to receiving the media content, determine whether the media content satisfies the event-specific media control parameters, the event-specific media control parameters comprising one or more of: permitting or restricting downloading of media by the members of the participant list, allowing or preventing saving of media to user galleries, specifying deletion protocols, and imposing time-based or content-based restrictions on access or modification of the media; and in response to determining that the media content satisfies the event-specific media control parameters during defined time interval when the event is active, upload the media content for access by the members of the participant list.

17. A computer system for creating time bound events with event specific media permissions for media handling and event prioritization, comprising:

one or more processors;

one or more computer readable storage media; and program instructions stored on the one or more computer readable storage media that when executed by the one or more processors, cause the one or more processors to:

provide a user interface of a secure content application with which a user can create an event specifying a defined time interval during which the event is active and event-specific media control parameters;

in response to the user creating the event, generate an event record comprising at least an event identifier, an associated title for the event, a timing attribute, a participant list, and the event-specific media control parameters; and control media contributions from members of the participant list during the defined time interval in which the event is active and in accordance with the event-specific media control parameters, by enabling (i) an upload of single or multiple media files selected from a device's camera roll and (ii) direct capture and upload of photos or videos from the device's camera roll into an event feed of the event, wherein the media contributions are permitted or restricted based on the event-specific media control parameters.

18. The computer system of claim 17, wherein the one or more processors executing the program instructions are further caused to:

generate an event-specific access code that encodes information accessing the event;

associate the event-specific access code with the members of the participant list; and send the event-specific access code to the members of the participant list; and in response to a member of the participant list accessing the event-specific access code, during the defined time interval when the event is active, determine whether the secure content application is already installed; and in response to determining that the secure content application is already installed, launch the secure content application and display media associated with the event for which the member of the participant list was invited.

19. The computer system of claim 18, wherein the one or more processors executing the program instructions are further caused to:

in response to determining that the secure content application is not already installed, direct the member of the participant list to a link to download the secure content application.

20. The computer system of claim 17, wherein the program instructions executed by the one or more processors, are further caused to:

provide, within the secure content application, a user interface comprising one or more selectable portions that display a list of active live events associated with the user; and in response to receiving a user selection of an active event and creating media within the application, automatically upload the created media to the event during the defined time interval for which the event is active.

* * * * *